Sept. 21, 1943.   W. M. CROOK   2,329,745
MEANS FOR PROTECTING BEARINGS OF ROLLER BITS
Filed Oct. 15, 1940
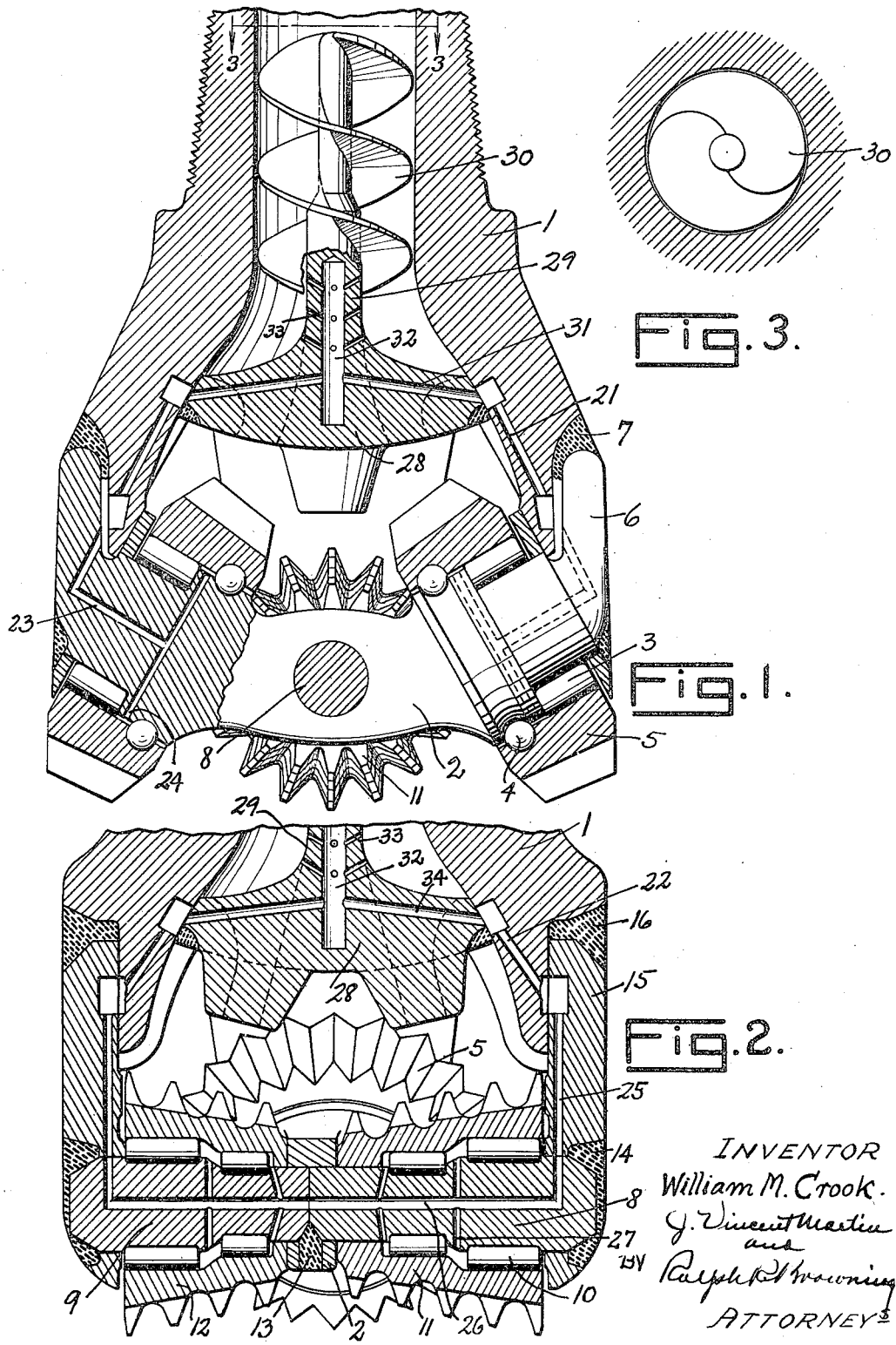

Patented Sept. 21, 1943

2,329,745

UNITED STATES PATENT OFFICE 2,329,745

MEANS FOR PROTECTING BEARINGS OF ROLLER BITS

William M. Crook, Houston, Tex., assignor to Reed Roller Bit Company, Houston, Tex., a corporation of Texas Application October 15, 1940, Serial No. 361,240

1 Claim. (Cl. 255—71)

This invention relates to roller bits and has for its general object the provision of a method and means whereby the bearings of the roller cutters may be protected from the action of gritty material usually present in the slush which surrounds the cutters while they are in operation.

Various expedients have been resorted to for the purpose of protecting these bearings against such grit, among these being the provision of packings at the ends of the cutter bearings, the use of parts shaped to form labyrinths to prevent flow of slush into the bearings, etc. However, these have not been as effective as is desired, and it is the object of this invention to provide an improved and more effective means and method of accomplishing this result.

A more specific object is to provide a means whereby the gritty fluid may be kept out of the bearings by the presence of a substantially grit free fluid under pressure within the bearings.

Other objects and advantages of this invention will become apparent from the following description and the accompanying drawing, wherein are set forth, by way of example, certain embodiments of this invention.

In the drawing:

Fig. 1 is a vertical cross section taken along the axes of the side cutters of a cross roller bit embodying this invention;

Fig. 2 is a view similar to the lower portion of Fig. 1 and showing the same structure, but taken along a plane through the axes of the cross cutters.

Fig. 3 is a fragmentary horizontal cross section taken along the line 3—3 of Fig. 1.

In the form shown, the bits include a body 1 having a bridge 2 across its lower end. The end portions of the bridge are provided with races for the rollers 3 and the balls 4 which provide bearings for the side cutters 5. The bridge has upstanding ears or lugs 6 secured to the lower end of the body 1 by welding 7. There are also cross cutter bearing shafts 8 and 9 providing races for a plurality of roller bearings 10 on which the cross cutters 11 and 12 are mounted. The inner ends of these shafts 8 and 9 are carried in and welded at 13 into an opening in the central part of the bridge. The outer ends of these shafts are welded at 14 into the lower ends of the legs 15 which in turn are welded to the body 1 at 16.

The structure just described forms no part of this invention but is used for the purpose of illustration only, and it will be understood that this invention may be employed as well with other types of roller bits.

In the form shown in the drawing, the slush plate 28 has an upstanding central post 29, on the upper part of which is a spiral vane 30 intended to give the slush pumped down through the bit a whirling motion. Such motion causes grit and solid matter in the slush to be thrown out against the outer walls of the passage by centrifugal force, leaving the central portion of the fluid column substantially grit free.

The slush nozzle plate 28 also has passages 31 connecting with the conduits 21 and 22 and extending into the hollow lower central portion 32 of the post 29. There are lateral openings 33 from the central hollow portion 32 to admit fluid from the central substantially grit-free portion of the slush column. The conduits 21 are continued at 23 through the lugs 6 of the bridge to terminate at 24 between the rollers 3 and the balls 4 of the side cutter bearings. The conduits 22 are continued at 25 through the legs 15 and at 26 through the cross cutter shafts 8 and 9 and terminate in lateral passageways 27 opening within the cross cutter bearings.

It will be seen that as slush is pumped to the bit just described, a certain relatively small portion of the slush will be diverted into the ports 33 and through the passageways 32, 31, 21, 22, 23, 25 and 26 to the interiors of the various cutter bearings. This slush may be clean enough to be admitted to the bearings as it comes from the slush pump, but it may and in all probability will usually contain some objectionable grit. This grit will be separated out by centrifugal force in the manner above mentioned and the grit-free slush thus produced at the central portion of the fluid column surrounding the stem 29 will be the slush conducted to the bearing. Because the flow to the bearings in the manner above described is relatively small the fluid thus supplied to the interiors of the bearings will be approximately at the same pressure as the pressure of the slush above the plate 28. On the other hand, the main body of slush passing through the nozzles to the space about the outside of the cutters will be considerably reduced in pressure. Therefore, the spaces within the bearings will by this invention be supplied with substantially clean fluid under higher pressure than the fluid outside of and about the cutters, and no fluid can, under these circumstances, flow from outside the cutters into the bearings to carry grit and other harmful substances into the bearings.

Having described my invention, I claim:

In a roller bit, a body, roller cutters mounted on said body, bearings for supporting said cutters on said body, means for conveying slush to said cutters during the drilling operation including a passageway through said body, a closure closing the lower end of said passageway, said closure having nozzle means therein for directing and discharging slush fluid onto said roller cutters, an upstanding post carried by said closure and positioned substantially axially of the passageway, means carried by said post for rotating slush flowing downwardly through said passageway, said post having a chamber formed therein and a plurality of ports placing said chamber in communication with the central portion of the passageway, and a duct having its inlet communicating with said chamber and its outlet in said bearings for supplying slush centrifugally freed of grit by rotation thereof in said passageway to said bearings under pressure.

WILLIAM M. CROOK.